UNITED STATES PATENT OFFICE.

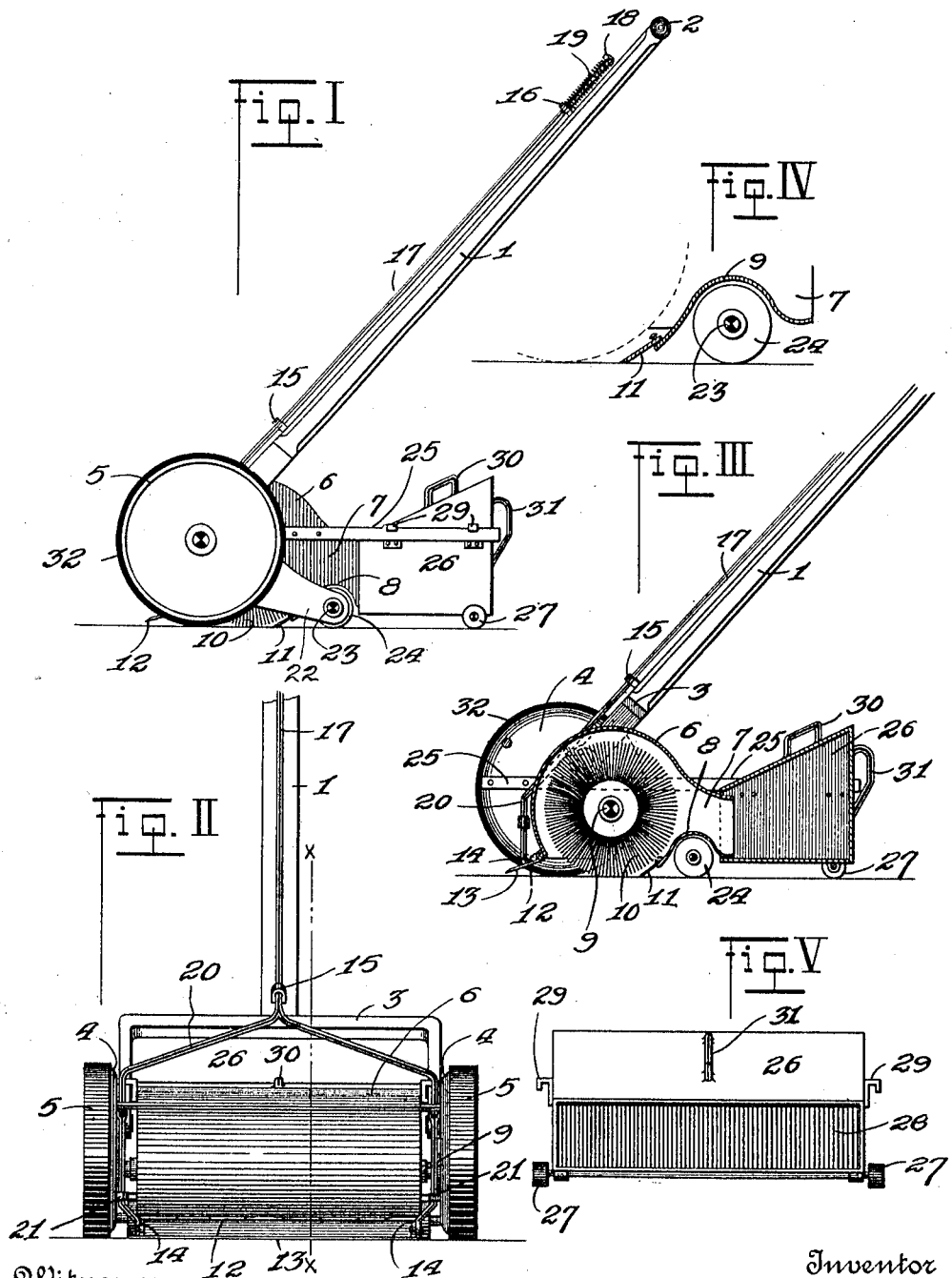

JOAN H. WOODBURY, OF OAKLAND, CALIFORNIA.

SWEEPER.

984,336. Specification of Letters Patent. Patented Feb. 14, 1911.

Application filed December 24, 1909. Serial No. 534,815.

*To all whom it may concern:*

Be it known that I, JOAN H. WOODBURY, a citizen of the United States, residing at Oakland, in the county of Alameda and State of California, have invented certain new and useful Improvements in Sweepers, of which the following is a specification.

This invention relates to manually operated sweepers for cleaning floors or streets, and has for its object to provide an improved sweeper, in which the dust can be readily carried into the dust receptacle and the apparatus manipulated in an effective manner.

Figure I is a view in side elevation of the improved sweeper. Fig. II is a front view thereof. Fig. III is a sectional view taken on the line X—X, Fig. II. Fig. IV is a detail sectional view of the rear end of the brush casing showing a roller therefor. Fig. V is a front view of the dust receptacle shown separated from the sweeper.

Referring to the accompanying drawing by numerals, 1 designates the elongated handle rod of the improved sweeper which has its outer or free end provided with the usual hand grip 2 and its lower end provided with the forked frame 3 the arms of which are hinged in the usual manner with the casing plates 4 of the supporting roller 5. Said casing plates have the usual gearing that is common in carpet sweepers, lawn mowers, and the like. The brush casing 6 has its sides connected to said casing plates 4 said casing having an open bottom portion and a contracted rearwardly extending neck 7, the bottom portion of which is concaved as indicated at 8. An axle 9 extends transversely across the interior of said brush casing 6, and has the usual rotary brush 10 mounted thereon. The open bottom of said brush casing 6 has its rear edge provided with a guard lip 11 that guides the dust to the neck 7 of the brush casing. At its forward edge the said open bottom has a hinged connection 12 with a scraper blade 13 that projects forwardly of said edge, said blade having a hinge ear 14 adjacent each end.

The handle rod 1 is equipped with spaced apart guiding eyes 15—16 in which an operating rod 17 is slidably mounted, the outer end of said rod projecting beyond the eye 16 and equipped with an adjusting nut 18. A spring 19 is coiled about the outer end of said rod 17, said spring being interposed between the adjusting nut 18 and the eye 16 so that by adjusting nut 18 longitudinally of rod 17 the tension of said spring may be regulated. The lower end portion of said rod 17 terminates in a forked extension 20 the arms of which pass through a guide eye 21 of each casing plate 4 and are pivotally connected to the hinge ears 14 of the scraper blade 13.

Each casing plate 4 has an arm 22 connected therewith, said arms projecting rearwardly and their face ends serve as bearings for a shaft 23 of an elongated roller 24 that extends beneath the concaved portion 8 of the neck 7 of brush casing 6.

A supporting arm 25 projects rearwardly from each casing plate 4, said arms being preferably arranged in a horizontal plane and being also suitably fastened to the outer surfaces of brush casing 6, their free ends projecting well beyond the outer end of neck 7.

A dust receptacle 26 has supporting rollers 27 at the rear end of its bottom, said receptacle having an open forward end 28 adapted to receive the outlet end of neck 7 of brush casing 6. The outer surfaces of the sides of said dust receptacle are provided with hooks 29 adapted to engage over the upper edge of arms 25 to hold the dust receptacle in firm but separable engagement with the neck 7 of brush casing 6. Said dust receptacle is provided with an upper hand grip 30 and a similar hand grip 31 at its rear to facilitate the handling of the same.

Rollers 5 are preferably equipped with resilient tires 32 to make the same noiseless.

It will be seen from the foregoing that the improved sweeper may be manually operated and that through the described rod connection 17 with the scraper blade 13 said blade may be depressed so that its cutting edge will contact with the surfaces being cleaned to loosen caked material thereon and that when the pressure is released from said rod 17 spring 19 will raise rod 17 longitudinally of handle rod 1 so that the scraper blade will be raised from contact with the surfaces being cleaned. It will also be seen that the described connection between the dust receptacle 26 and brush casing 6 assures of said receptacle being normally retained in position so that it will receive all of the material discharged through the neck of said casing, but that the said receptacle may be readily removed when desired so that its contents may be emptied.

What I claim as my invention is:—

A sweeper comprising a casing mounted on rollers and having a transverse opening in its bottom, a contracted rearwardly extending discharge neck, and rearwardly extending bars, a roller mounted on the end of each of said bars, a guard lip mounted on the rear edge of said transverse opening below the mouth of said contracted neck, an elongated handle hinged to said casing, a rotary brush mounted in said casing and projecting through said transverse opening, horizontal bars, each mounted on one side of said casing and projecting rearwardly therefrom, and a detachable dust receptacle having an open front end into which the discharge neck projects and is seated, said dust receptacle being detachably mounted on said rearwardly extending bars, and provided with rollers.

In testimony whereof I affix my signature in presence of two witnesses.

JOAN H. WOODBURY.

Witnesses:
F. P. SCHROEDER,
H. C. SCHROEDER.